United States Patent [19]

Brunsting et al.

[11] 4,188,543
[45] Feb. 12, 1980

[54] ELLIPSOID RADIATION COLLECTOR APPARATUS AND METHOD

[75] Inventors: Albert Brunsting, Miramar; Walter R. Hogg, South Miami, Fla.

[73] Assignee: Coulter Electronics, Inc., Hialeah, Fla.

[21] Appl. No.: 899,584

[22] Filed: Apr. 24, 1978

Related U.S. Application Data

[63] Continuation-in-part of Ser. No. 888,567, Mar. 20, 1978, abandoned.

[51] Int. Cl.² .................. G01J 1/58; G01N 21/38; G01N 33/16; G01N 21/00
[52] U.S. Cl. ...................... 250/458; 250/461 B; 250/373; 356/39; 356/318; 356/339
[58] Field of Search ............ 250/458, 461 B, 574, 250/228, 504; 350/293; 362/305; 356/39, 236, 338, 339, 341, 342, 318

[56] References Cited

U.S. PATENT DOCUMENTS

| | | | |
|---|---|---|---|
| 1,463,623 | 7/1923 | McCarthy | 362/302 |
| 2,064,252 | 12/1936 | Fortney | 362/305 |
| 3,028,483 | 4/1962 | Simmon | 350/293 |
| 3,494,693 | 2/1970 | Elmer | 362/302 |
| 3,784,836 | 1/1974 | Tolliver | 250/504 |
| 3,946,239 | 3/1976 | Salzman et al. | 250/461 B |
| 3,989,381 | 11/1976 | Fulwyler | 356/39 |

Primary Examiner—Davis L. Willis
Assistant Examiner—Carolyn E. Fields
Attorney, Agent, or Firm—William A. Newton

[57] ABSTRACT

Disclosed is a radiation collector apparatus and method primarily for counting and analyzing a flow of dilute particulate material, such as blood cells, sperm cells and the like, through the use of radiation detection. The radiation collector apparatus comprises a reflector chamber having an ellipsoidal reflector surface with a pair of ellipsoidal foci defining a primary focus and secondary focus. A window is formed in the ellipsoidal reflector surface and is centered on a symmetry axis defined by the primary and secondary foci. In operation the radiation collector apparatus is provided with an intensified beam of radiation and a stream of particulate material aligned to intersect the intensified beam of radiation at one of the ellipsoidal foci. Detectable radiation, either directly or after one or more reflections, proceeds through the window in an organized beam for detection.

21 Claims, 3 Drawing Figures

ELLIPSOID RADIATION COLLECTOR APPARATUS AND METHOD

CROSS-REFERENCE TO RELATED APPLICATION

This application is a continuation-in-part of an earlier filed application Ser. No. 888,567, filed Mar. 20, 1978, now abandoned.

FIELD OF THE INVENTION

The present invention is directed to the collection of detectable light signals radiating from individually isolated particulate material, such detectable light signals being used for the counting and analysis of particulate materials.

DISCUSSION OF THE PRIOR ART

The quantitative measurement, counting and analysis of cells and like particulate material have become very important parts of biomedical research. Various flow cytometers exist in the prior art and have been devised to measure a range of cellular substances and properties, with some of these properties having to be measured on a cell by cell basis. The flow cytometers were improved by incorporating a laminar sheath-flow technique, which confines cells to the center of a flow stream, and a laser beam for intersecting the cell flow, which produces scattered light from the laser beam and/or fluorescent light from stained cells when the laser beam is at the proper wave lengths. Prior to U.S. Pat. No. 3,946,239, to Salzman et al, the cytometers were inefficient in collecting the scattered and fluorescent light, which made it difficult or impossible, in some cases, to investigate weakly fluorescing dyes bound to cells and fluorescence from small particles. More specifically, when there is inefficient collection of light, measurements of weak signals are made difficult due to the poor signal to noise ratio. The efficiency of light collection was improved by the ellipsoidal reflection chamber of U.S. Pat. No. 3,946,239. As disclosed in "The Journal of Histochemistry and Cytochemistry", Volume 25, No. 7, page 784, the flow chamber of U.S. Pat. No. 3,946,239 collects about sixty percent of the total cell fluorescence. Although this particular device made an improvement in efficiency of collecting scattered light and fluorescence, there are several inherent problems still remaining with the prior art as it has progressed up to and through U.S. Pat. No. 3,946,239, as will be discussed below.

First, in U.S. Pat. No. 3,946,239, most of the light that proceeds past the second focal point of the ellipsoidal flow chamber without any reflection off the ellipsoidal surface is lost for the purposes of collection. More specifically, the utilization of the end of the ellipsoid flow chamber for the placement of the conical reflector decreases the total elliptical surface available for reflection and therefore decreases the collection angle and efficiency of the chamber. In addition, light reflecting off of the end of the ellipsoidal chamber converges at an extremely wide angle relationship relative to the center axis of the conical reflector, resulting in extremely inefficient use of the reflected light. Part of this inefficient use of light is due to multiple reflections of the light within the conical reflectors. The decrease in collection angle and efficiency in turn makes the chamber more sensitive to asymmetric particle orientation in the flow system, as well as lessening the ability to analyze weak fluorescent particles.

Secondly, in U.S. Pat. No. 3,946,239, when the light that is converged at the second focal point of the ellipsoid chamber is collected by the conical reflector, the collected light is neither focused nor collimated and therefore arrives at the photosensitive measuring device in a disorganized manner at many different angles. The nonorthogonal approach of the collected light to the photosensitive measuring device reduces the efficiency of the photosensitive device and its filters in that such devices are best suited to light impinging orthogonally on their surfaces. Moreover, due to the light being disorganized, conventional means, such as lenses, for creating more orthogonal light cannot be used with the device of U.S. Pat. No. 3,946,237.

Thirdly, the orifice of the conical reflector of U.S. Pat. No. 3,946,239, which collects the light is sufficiently large to allow stray light to be gathered. This orifice must be larger than the sensing zone (intersection of stream of particles and the laser beam). Additional width to the orifice is required by the wide angle convergence of the light at the second focal point and the extreme eccentricity of the ellipsoidal chamber. In U.S. Pat. No. 3,946,239 a pinhole orifice would be extremely inefficient, in that positioning would be critical in three dimensions and, if it were not perfectly positioned, practically no light would pass therethrough. This is due primarily to the light approaching the pinhole at angles widely different from the normal.

The cytometer of U.S. Pat. No. 3,946,239, although having a relatively good efficiency, can be described as being partially "blind". In other words, if light emanating from a particle is highly concentrated in some preferred solid half-angle, there is a possibility that it could be missed entirely even though this collector is efficient. More specifically, many particles are not spherical, but behave as combinations of oddly shaped mirrors and lenses, and hence cause "hot spots" in which large percentages of available light are directed in preferred directions. Consequently, in that this prior art cytometer does not collect light from all possible directions and collects light extremely inefficiently in other directions, there exists the possibility of "hot spots" being aimed at a "blind" region. The net result is that some of the particles will cause some unpredictable percentage of the light emanating from them to be collected. This will smear a histogram generated by plotting the number of particles of a given intensity versus that intensity to the left, since many of the particles will appear dimmer than they actually are. Discrepancies of this magnitude are important. For instance, it is desirable to distinguish cells with X chromosomes from those with Y chromosomes, but at the present state of the art this is not possible.

It should also be noted that with the more efficient gathering of fluorescence and scattered light, the less powerful the laser beam needs to be, therefore leading to cost savings.

Other relevant prior art includes U.S. Pat. No. 3,494,693 to Elmer which teaches the use of coincident axis for reflecting means in the emission of heat. In addition, U.S. Pat. No. 3,989,381 discloses an inefficient light collector.

Accordingly, it can readily be seen that there is a need in the industry for a cytometer which is more efficient in collecting scattered light and fluorescence, and is more efficient in impinging the collected light on the photosensitive detectors. This increase in efficiency can result in being able to detect signals not previously detectable above the noise, decreasing the impact of the shape and orientation of particulate matter in the flow stream by eliminating "blind" regions, and allowing for lower powered lasers.

SUMMARY OF THE INVENTION

The present invention is directed toward a radiation collector apparatus and method primarily for analyzing a flow of individually isolated particles, such as blood cells, sperm cells and the like, through the use of radiation detection. The radiation collector apparatus comprises a reflector chamber having a substantially ellipsoidal reflector surface with a primary focus and a secondary focus defining a symmetry axis. Centrally positioned on the symmetry axis is a window formed in the reflector chamber. A source of detectable radiation produced by irradiating the particles is disposed at one of the foci of the ellipsoidal reflector surface. In operation, the detectable radiation emanating from one of the foci proceeds either directly or after one or more reflections through the window in an organized beam to be subsequently analyzed.

DESCRIPTION OF THE DRAWINGS

Further objects and advantages of the present invention will become apparent as the following description proceeds, taken in conjunction with the accompanying drawings in which.

DETAILED DESCRIPTION OF THE PREFERRED EMBODIMENTS

Figure 1:
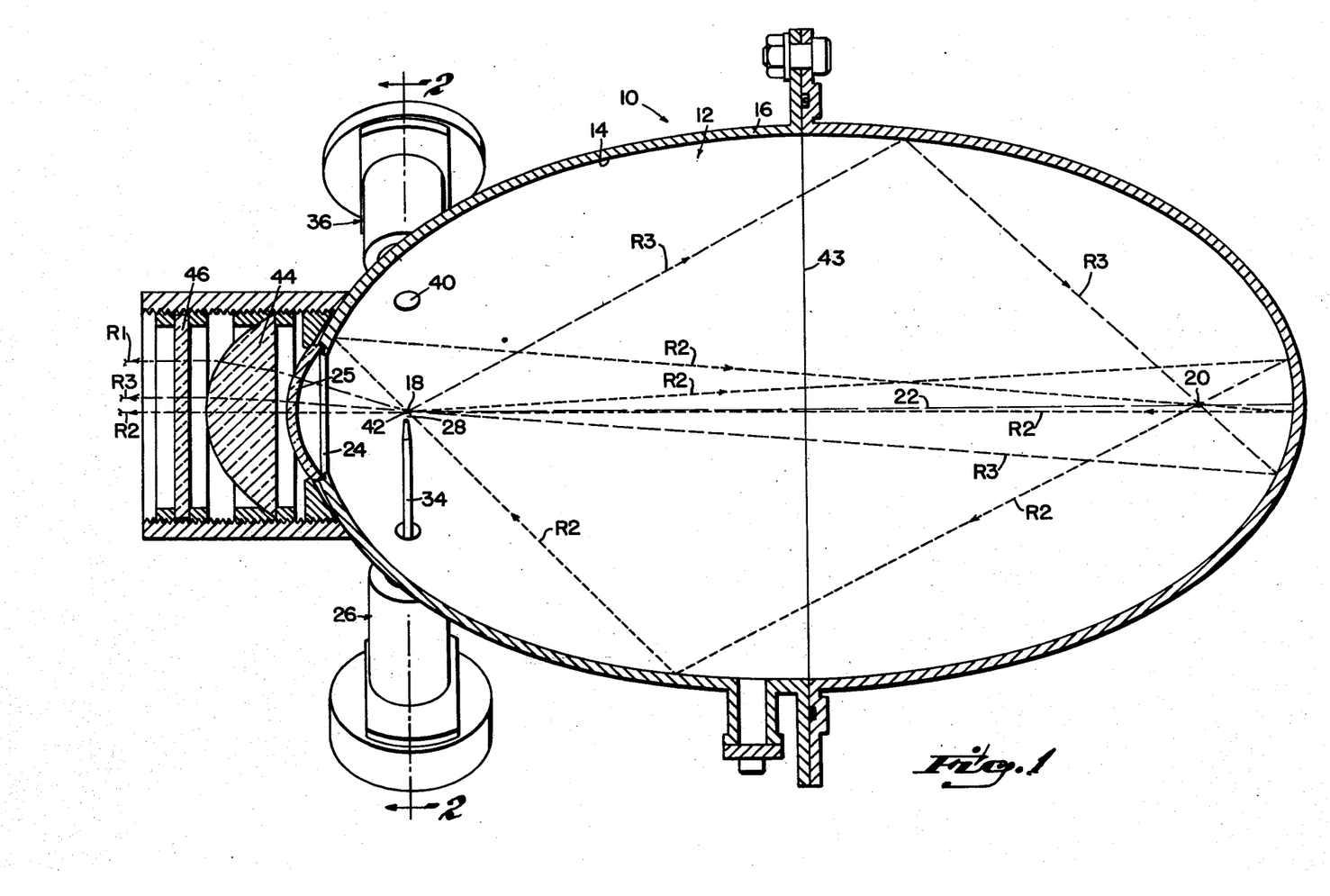
FIG. 1 is a cross-sectional view of the first embodiment of the radiation collector apparatus of the present invention taken along a plane passing through the major axis of the ellipsoidal reflector surface as depicted by the section line 1—1 of FIG. 2.

Referring to FIG. 1, there is shown a first embodiment of a radiation collector apparatus, generally represented by numeral 10, for collecting detectable radiation produced by irradiating individually isolated particulate material. The radiation collector apparatus 10 comprises a reflector chamber 12 having an internal ellipsoidal reflector surface 14 defined by a housing 16. The ellipsoidal reflector surface 14 has the configuration of an ellipsoid of revolution about the major axis, or, to describe the configuration in another way, a spheroid. More specifically, every ellipse has a major axis and a minor axis. The revolution of this ellipse about the major axis generates an ellipsoid of revolution. As with all ellipsoids of revolution, the ellipsoidal reflector surface 14 has a primary focus 18 and a conjugate secondary focus 20. The primary and secondary foci 18 and 20 define a symmetry axis 22.

As depicted in FIG. 1, an opening or window 24 is formed in the ellipsoidal reflector surface 14 so as to provide an exit for radiation. The window 24 is aligned to be preferably centered on symmetry axis 22. In the preferred embodiments a confining window glass 25 retains the fluid in the reflector chamber 12. Depending upon the usage of the reflector chamber 12 with aerosols or hydrosols, it may or may not be desirable to have the window glass 25. Preferably, the window glass 25 in the preferred embodiments has a spherical configuration with the inner and outer radii thereof having a center at the primary focus 18. As will become more apparent hereinafter, the spherical configuration of window glass 25 allows for the exiting radiation to pass orthogonally through its surfaces, minimizing intensity losses and refractive bending.

Figure 2:
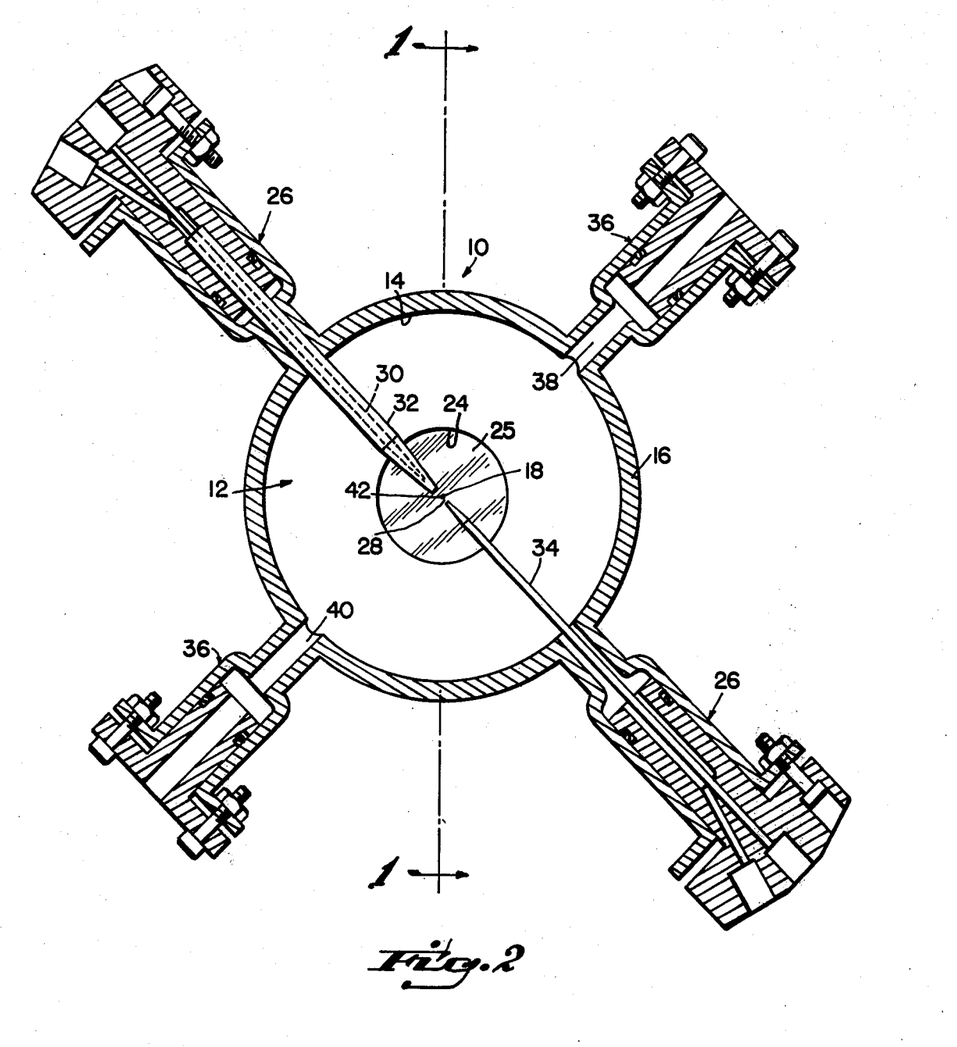
FIG. 2 is a cross-sectional view of the first embodiment of the radiation collector apparatus of the present invention taken along a plane passing through the primary focus of the ellipsoidal reflector surface as depicted by section line 2—2 in FIG. 1.

Referring to the first embodiment as illustrated in FIG. 2, means for entraining the particulate material through the primary focus 18 of the ellipsoidal reflector surface 14 is generally represented by numeral 26. The entraining means 26 provides for fluid transport of individually isolated particulate material in suspension through a measurement region 28. More specifically, in the preferred embodiments entraining means 26 includes an entrance tube 30 which ideally provides a stream of sequential particulate material and an outer sheath tube 32 which encompasses the entrance tube 30 and provides sheathing fluid. Likewise, on the other end of the measurement region 28, there is normally positioned an exit tube 34 having an orifice for receiving the stream of particulate material. Laminar fluid flow is maintained through the measurement region 28 by the introduction of the sheathing fluid, along with the creation of a differential pressure between the quiescent volume and the sheathing fluid and the sample cell flow. In the preferred embodiments the reflector chamber 12 is filled with a particulate-free fluid medium. The reflector chamber 12 could use a liquid medium as in the preferred embodiments or a gaseous medium could be used with the present invention in which case the window glass 25 may be omitted. The specific construction of the entraining means 26 which provides passage of the particulate material through the measurement 28 is of conventional design.

As depicted in FIG. 2, means for irradiating the particulate material with preferably a high intensity light beam, such as a laser excitation beam, is generally indicated by numeral 36. Irradiating means 36 includes a beam entrance orifice 38 and a beam exit orifice 40. Exteriorly positioned relative to the orifices 38 and 40 are, respectively, a beam source (not shown) and a beam dump (not shown) for emitting and disposing of the light beam. The two orifices 38 and 40 are aligned with each other so as to preferably, but not necessarily, allow the light beam passing therebetween to intersect orthogonally the flow of particulate material in the measurement region 28. As will become apparent hereinafter the light beam must approximately intersect the flow of particulate material at the primary focus 18 of ellipsoidal reflector surface 14. It should be appreciated that although laser light is used to illustrate the operation of the preferred embodiments of the present invention, the particulate material could be impinged upon by other forms of radiant energy as will become more apparent hereinafter.

Although scattered light and fluorescent light are commonly collected, it should be understood that the present invention may also be used to collect other forms of radiant energy from particulate material. Consequently, the term "detectable radiation" may include any radiant energy which propagates in straight lines and undergoes specular reflection, such as light, infrared radiation and ultraviolet radiation. However, for the purposes of describing the preferred embodiments, scattered light and fluorescent light will be used as examples of detectable radiation.

In one type of analysis, the laser excitation beam is scattered by the particles so that most of the scattered light will deviate from and not be received by the beam exit orifice 40. Another analysis commonly used in the industry is to excite fluorescence as biological cells traverse the laser excitation beam. Fluorescent excitation is normally accomplished by staining the cells with a fluorescent dye and dispersing the cells into a suspension sufficiently dilute that the cells proceed one by one through the primary focus 18. In either case, there is typically scattered laser light and/or relatively weak fluorescent light, both which hereinafter will be termed "detectable radiation". Consequently, the interaction of the irradiating means 36 with the particulate material defines a source 42 of detectable radiation at the primary focus 18 in the first embodiment. The above described procedure of having a laser excitation beam intersect a sample stream of particulate material, possibly stained, at one of the foci of the ellipsoid is a well known procedure in the art.

Referring to FIG. 1, in operation the radiation collector apparatus 10 illuminates the particulate material stream to produce detectable radiation which emanates outward from the primary focus 18. In the first embodiment of the present invention illustrated in FIG. 1, the window 24 is positioned adjacent the source of detectable radiation 42. In the first embodiment the detectable radiation either proceeds directly through the window 24 as illustrated by ray R1 or is reflected two or more times off of the ellipsoidal reflector surface 14 before exiting through window 24 as illustrated by rays R2 and R3. As to the reflected detectable radiation, the number of reflections of a given ray will depend on the position of the initial intersection of the ray with the ellipsoidal reflector surface 14 after emanating from the primary focus 18 and the solid angle subtended by the window 24 relative to the primary focus 18. With an exception of an insignificant amount of detectable radiation all reflected rays exit after two or more reflections from the window 24 regardless of the size of window 24.

As illustrated in FIG. 1, a plane perpendicular to the symmetry axis 22 containing all possible orientations of the minor axis of the ellipsoidal reflector surface 14 will hereinafter be termed "bisecting plane 43". In the first embodiment the intersection of the bisecting plane 43 with the ellipsoidal reflector surface 14 subtends a solid angle at the primary focus 18 which is equal to the solid angle subtended by the window 24 at the primary focus 18. The bisecting plane 43 may be viewed as dividing the ellipsoidal reflector surface 14 into two equal halves. With this solid angle of the window 24, almost all of the reflected detectable radiation is reflected either two or four times. More specifically, the vastly greater amount of reflected detectable radiation is reflected twice prior to passing through the primary focus 18 and subsequently exiting through the window 24, as illustrated by ray R3. Additionally, a small amount of the reflected detectable radiation which emanates in a cone centered on the symmetry axis 22 is reflected four times prior to passing through the primary focus 18 and subsequently exiting through window 24, as illustrated by ray R2. This cone intersects the ellipsoidal reflector surface 14 in an area having a solid angle, with respect to the secondary focus 20, equal to the solid angle formed by the bisecting plane 43 with respect to the secondary focus 20. Only for the purposes of a complete explanation, it should be noted that a miniscule amount of detectable radiation centered about the symmetry axis 22 is reflected only once before exiting from the window 24. With the exception of the above described miniscule amount, the detectable radiation exiting from the window 24 is organized in that such radiation passes through and proceeds from the primary focus 18. This permits the use of techniques commonly used with convergent, divergent or collimated radiation, such as filtering out stray radiation with a pinhole, or the concentration of radiation in a narrow beam for more efficient use of the same by detector means 45.

Figure 3:
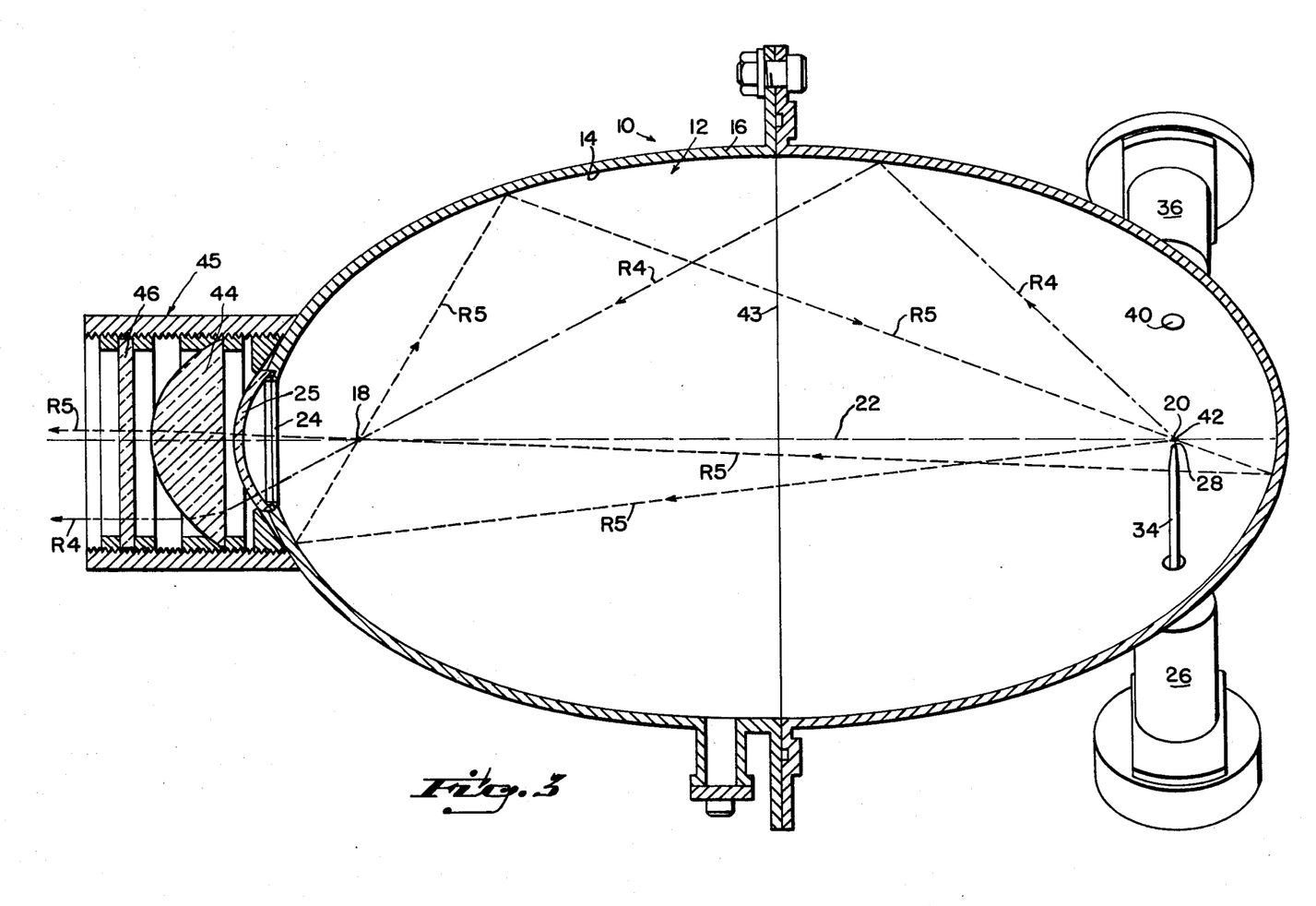
FIG. 3 is a cross-sectional view of an alternative embodiment of the present invention taken along a plane passing through the major axis of the ellipsoidal reflector surface.

A second alternative embodiment of the present invention is illustrated in FIG. 3. As previously described, the first embodiment of FIG. 1 has the source 42 of detectable radiation positioned at the primary focus 18 so that the source 42 is adjacent the window 24. In the alternative embodiment of FIG. 3, the source 42 of detectable radiation, and therefore the entraining means 26 and irradiating means 36, are positioned at the secondary focus 20. The significance of this second embodiment is that the source 42 is now positioned at the most remote focus relative to the window 24. With reference to the drawings, the second embodiment could have been shown just as well by leaving the source 42 at the primary focus 18 and moving the window 24 to the other end of the reflector chamber 12. In summary, the second embodiment of FIG. 3 has the source 42 positioned at the most remote focus relative to the window 24, while the first embodiment of FIG. 1 has the source 42 positioned at the focus adjacently disposed relative to the window 24. Consequently, identical elements which have merely been transferred from one focus to the other focus, such as irradiating means 36 and entraining means 26, retain the same reference numerals in the drawings for both embodiments.

In the second embodiment of FIG. 3, most of the detectable radiation is reflected one or more times off of the ellipsoidal reflector surface 14 before exiting through window 24 as illustrated by rays R4 and R5. As to the reflected detectable radiation, the number of reflections of a given ray will depend on the position of the initial intersection of the ray with the ellipsoidal reflector surface 14 after emanating from the secondary focus 20 and the solid angle subtended by the window 24 relative to the primary focus 18. Generally, all reflected rays exit after one or more reflections through the window 24 regardless of the size of window 24.

As with the first embodiment of FIG. 1, in the second embodiment of FIG. 3 the intersection of the bisecting plane 43 with the ellipsoidal reflector surface 14 subtends a solid angle at the primary focus 18 which is equal to the solid angle subtended by the window 24 at the primary focus 18. With this solid angle of the window 24 almost all of the reflected detectable radiation is reflected either once or three times. More specifically, the detectable radiation emanating from the secondary focus 20 which initially impinges upon the near half portion of the ellipsoidal reflector surface 14 defined by the bisecting plane 43 is reflected once before exiting through the window 24 as illustrated by ray R4. This constitutes the vast majority of the detectable radiation. The detectable radiation emanating from the secondary focus 20 which initially impinges upon the remote half portion of the ellipsoid reflector surface 14 defined by the bisecting plane 43 is reflected three times before exiting through the window 24 as illustrated by ray R5. Only for the purposes of a complete explanation it should be noted that a minuscule amount of the detectable radiation passes through the window 24 without reflection and without passing through the primary focus 18. With the exception of the above described minuscule amount, the detectable radiation exiting from the window 24 is organized in that such radiation passes through the proceeds from the primary focus 18. This permits the use of techniques commonly used with convergent, divergent or collimated radiation, such as filtering out stray radiation with a pinhole, or the concentration of radiation in a narrow beam for more efficient use of the same by the detector means 45.

It should be noted that in the first and second embodiments the window 24 subtending a solid angle equal to that of the bisecting plane 43 is merely a matter of design preference. There are certain design preferences which may suggest a larger or smaller window 24. For instance, if the window 24 is dimensioned to have a smaller solid angle than previously described, then portions of the detectable radiation will be reflected more than the number of times previously described. More specifically, in the first embodiment of FIG. 1 if the previously described solid angle of the window varies from that shown in the drawings, the previously described areas of four reflections and two reflections will no longer be valid. Likewise, in the second embodiment of FIG. 3 the areas of one reflection and three reflections would no longer be valid. As illustrative of some factors to be considered, the disadvantage of more reflections, and therefore decrease in radiation intensity, must be weighed against the advantages of having a smaller collection angle for a lens 44, (to be described hereinafter) which allows for the lens 44 to have a larger f-number. Generally, too small a window 24 would be undesirable due to the number of reflections. On the other hand, if a simple economical collimating lens 44 is included with the invention as shown in FIG. 1 and if the f-number of the lens 44 is made too small (e.g. less than 0.7) by making the window 24 too large, significant chromatic aberration would result from the lens 44. Chromatic abberation may be an important consideration if more than one fluorescent wavelength is to be collected or if white light is used. Consequently, the design considerations of loss of radiation intensity by reflection, the angle of collection of detectable radiation passing through the window 24 and other similar factors all dictate the size of the window 24, such sizing being considered to be merely a matter of design performance. Accordingly, variations in the size of the window 24 is considered to be within the scope of this invention.

In the practical application of the radiation collector apparatus 10, the foci 18 and 20 are actually focal zones and not theoretical points. In the preferred embodiments the intersection of the particulate material, which may be the width of several particles, with the laser beam may create a "sensing zone" of radiation at one of the foci 18 or 20, depending upon the embodiment, having a volume of up to 10,000 cubic microns in the preferred embodiments. More specifically, the finite dimensions and somewhat diffused (Gaussian) distribution of radiation, convolved with the path of the particulate suspension, gives rise to this "sensing zone". For instance, with the first embodiment of FIG. 1, this zone at the primary focus 18 is centered around a mathematical, infinitisimally small focal point and is represented in the drawings as a single point. As is well known in the art, a zone centered at the first focal point of the ellipsoid creates a corresponding zone of radiation centered at the second focal point of the ellipsoid. Although identified as a geometrical point for the purposes of illustration in the drawings, the term "focus" refers to a focal zone generally centered about an infinitisimally small focal point.

A distortion to the configuration of the first half of the ellipsoidal reflector surface 14 relative to the bisecting plane 43 may be introduced and compensated for by correspondingly modifying the second half of the ellipsoidal reflector surface 14 by the use of numerical techniques to provide the same results of returning the reflected detectable radiation to the primary focus 18. Consequently, with the introduction of such distortions, the ellipsoidal reflector surface 14 would deviate from a precise ellipsoidal conic section configuration but the two described halves in combination would accomplish the same result. Also, the introduction of a relatively small distortion to one of the halves produces larger zones for the reflected detectable radiation at the foci 18 and 20. Such larger zones are not particularly desirable, but in certain applications are tolerable. It should be understood that such mere changes in configuration as described in this paragraph are considered to be within the scope of this invention, and for this reason the claims of this application use the term "substantially" when referring to the configuration of the ellipsoidal reflector surface 14.

The detector means 45 (partially shown) is normally positioned exterior to the window 24 along the symmetry axis 22 for the conversion of detectable signals to electrical signals so as to provide subsequent data acquisition. The specific construction of the detector means 45 with its associated optics for the preferred embodiment may be of many conventional designs well known to those skilled in the art. The detector means 45 receives the detectable radiation and converts the detectable radiation into electrical signals to be used in a conventional pulse height analyzer or similar well known data acquisition device. For the preferred embodiments in which the detectable radiation comprises light the typical detector means 45 would normally comprise a well known photosensitive detector (not shown), preferably in the form of photomultiplier tubes, vacuum photodiodes or solid state photodiodes and the like. Normally, although not necessarily, the detector means 45 would include the collimating lens 44 for providing normal light to the photosensitive surfaces of the photosensitive detector as shown in FIGS. 1 and 3. The more othogonally that the original beam arrives at the photosensitive surface of the photosensitive detector, the more efficiently the photosensitive detector operates. In addition, an optional light color filter 46 may be included which also operates more efficiently with normal light. In summary the formation of the detectable radiation into an organized diverging beam proceeding from the primary focus 18 allows for the more efficient use of optional light color filters, such as the filter 46, and the photosensitive detector. Additionally, this organized light would also allow for the use of other optical techniques available for collimated, divergent, and convergent light, such as the incorporation of a pinhole aperture for filtering out stray light.

As previously described, in particle analysis detectable radiation, commonly either scattered light or fluorescent light, emanates outward from the primary focus 18 or the secondary focus 20, depending upon the embodiment, in distribution patterns known to those skilled in the art. Using the first embodiment of FIG. 1 as an example, the radiation which emanates outward from the primary focus 18 may take any radial direction in an imaginary sphere centered about the primary 18. The solid angle subtended will be utilized in this application to relate to the reflector surface area which is lost for reflection of radiation which emanates from the primary focus 18. The collection angle therefore is the total possible angle of radiation $4\pi$ steradians, minus the solid angles of lost radiation collection. As examples of items that result in loss of collection angle, the following items are exemplary, but not exclusive. First, the outer sheath tube and exit tube 32 and 34 respectively, along with beam entrance and exit orifices 38 and 40 respectively, creates four relatively small solid angles of loss. In the prior art devices, the largest solid angle of lost radiation created is with the conical light collector or its equivalent. However, there is no significant solid angle of lost radiation collection formed with any substantial portion of the ellipsoidal reflector surface 14 of the present invention. In the present invention the formation of a larger collection solid angle relative to those existing in the prior art ellipsoidal chambers, creates a greater radiation collection efficiency and insensitivity to particle orientation.

The design of the radiation apparatus 10 provides for greater collection efficiency for detectable radiation than the prior art collectors. This improved efficiency is primarily due to a substantially $4\pi$ steradian collection angle combined with the efficient usage of the radiation collected. Part of this efficient usage of the radiation collected lies in collecting radiation with the previously described wide angle relationship with a minimum of reflections and therefore lessening intensity losses. Yet another part of this efficient usage of the radiation collected includes maintaining an organized beam of collected radiation during the collection process so as to permit the utilization of conventional techniques commonly used with organized radiation. Examples of such techniques include providing a relatively orthogonal approach for the rays to the detector means 45 and its associated light color filter 46 for more efficient operation of the same. Additionally, organized radiation allows for the incorporation of a pinhole aperture for filtering out stray radiation. Moreover, it should be appreciated that light has a very broad spectrum; hence, reflectors are better than lenses which act as refractors of the collected light and therefore cause chromatic aberration. Also, the design of the present invention permits relatively small eccentricities so that the magnification from the primary focus 18 to the secondary focus 20, or vice versa, is not excessive.

The present invention is useful if the detectable radiation comes from a source which is so small that it has negligible self-shadowing effects as the light passes through the focus containing the source after one or multiple reflections. It should be noted that with the analysis of particulate material, the particles normally are sufficiently small so that blockage of radiation passing through the focus containing the particles is relatively insignificant.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

METHOD

There is disclosed a method of collecting detectable radiation produced by the presence of individually isolated particulate material by radiating the detectable radiation from a focus 18 or 20, depending upon embodiment, of ellipsoidal reflector surface 14. The method comprises reflecting off of the ellipsoidal reflector surface 14 a first portion of the detectable radiation emanating from one of the foci 18 or 20 at least once prior to passing the first portion in an organized beam through the window 24. In the first embodiment of FIG. 1, the first portion of the detectable radiation is reflected twice before exiting through the window 24. In the second embodiment of FIG. 2, the first portion of the detectable radiation is reflected once before exiting through the window 24. The method further comprises reflecting off of the ellipsoidal reflector surface 14 a second portion of the detectable radiation emanating from one of the foci 18 and 20 at least three times prior to passing the second portion in an organized beam through the window 24. In the first embodiment, the second portion of the detectable radiation is reflected at least four times prior to passing the same through the window 24. In the second embodiment, the second portion is reflected at least three times prior to passing the same through the window 24. In both embodiments the second portion of the detectable radiation is reflected by at least one pair of reflections more than the number of reflections of the first portion of the detectable radiation. If the window 24 is made smaller than that shown in the drawings and previously described, the amount of the first portion of radiation becomes smaller and the amount of the second portion of radiation becomes larger. Moreover, if the window 24 is made small enough a part of the second portion of the detectable radiation may have more than one additional pair of reflections over the number of reflections of the first portion of the detectable radiation. It should be noted that in the first embodiment a third portion of the detectable radiation emanating from the primary focus 18 proceeds directly through the window 24 without reflection in an organized beam.

Generally, the detectable radiation proceeding from one focus of the pair of foci 18 and 19 which impinges upon the remote end of the reflector chamber 12 converges toward the other focus of the pair of foci 18 and 19 at a relatively wide angle relationship to the symmetry axis 22. The window 24 prevents the detectable radiation exceeding a predetermined wide angle relative to the symmetry axis 22 (half angle subtended by the window 24 at the primary focus 18) from exiting through the reflector chamber 12. Consequently, the detectable radiation proceeding through the primary focus 18 that has been reflected twice in the first embodiment or once in the second embodiment which exceeds the predetermined wide angle is reflected at least two more times whereby the same subsequently proceeds through the primary focus 18 at a smaller angle relative to the symmetry axis 22. If this smaller angle of the reflected detectable radiation does not exceed the predetermined wide angle no additional pairs of reflections are necessary before the radiation passes through the window 24. By virtue of the multiple reflection of portions of the detectable radiation, almost all of the reflected detectable radiation passes through the window 24 in an organized beam.

What is claimed is:

1. A radiation collector apparatus for analyzing individually isolated particles wherein irradiation of the particles produces a source of detectable radiation, comprising:
   a reflector chamber having a substantially ellipsoidal reflector surface with a pair of foci defining a symmetry axis,
   a window formed in said reflector chamber and aligned in intersecting relationship with said symmetry axis,
   said window being dimensioned and configured to provide for a portion of the detectable radiation to reflect within said reflector chamber more than once,
   whereby almost all of the detectable radiation emanating from one of said foci proceeds either directly or after one or more reflections through said window in an organized beam to be analyzed.

2. In the radiation collector apparatus of claim 1, the source of detectable radiation being positioned at the more remotely disposed focus of said pair of foci relative to said window.

3. In the radiation collector apparatus of claim 1, the source of detectable radiation being positioned at the more adjacently disposed focus of said pair of foci relative to said window.

4. In the radiation collector apparatus of claim 1, means for irradiating the particulate material with light at one of said foci to produce detectable radiation deviating from the path of the irradiating light, said detectable radiation deviating from the path of the irradiating light defining the source of detectable radiation.

5. In the radiation collector apparatus of claim 4, said detectable radiation deviating from the path of the irradiating light comprising scattered light.

6. In the radiation collector apparatus of claim 4, said detectable radiation deviating from the path of the irradiating light comprising fluorescent light.

7. In the radiation collector apparatus of claim 4, means for passing the particulate material through said focus being irradiated to produce said detectable radiation.

8. In the radiation collector apparatus of claim 7, detector means cooperatively positioned on said symmetry axis for receiving said detectable radiation.

9. A method of collecting detectable radiation produced by the presence of individually isolated particulate material, comprising the steps of:
   radiating the detectable radiation from a focus of an ellipsoidal reflector surface of a reflector chamber,
   reflecting a first portion of the detectable radiation comprising most of the detectable radiation emanating from the focus off of the ellipsoidal reflector surface at least once,
   reflecting a second portion of the detectable radiation comprising a part of the remaining detectable radiation emanating from the focus at least three times,
   thereafter passing the reflected detectable radiation through a window formed in the ellipsoidal reflector surface in an organized beam.

10. In the method of claim 9, the step of reflecting the first portion of the detectable radiation at least once comprising reflecting the detectable radiation only twice prior to passing the same through the window in an organized beam.

11. In the method of claim 10, the step of reflecting the second portion of the detectable radiation at least three times comprising reflecting the detectable radiation at least four times prior to passing the same through the window in an organized beam.

12. In the method of claim 10, the step of reflecting the second portion of the detectable radiation at least three times comprising reflecting the detectable radiation only four times prior to passing the same through the window in an organized beam.

13. In the method of claim 11, passing a third portion of the remaining detectable radiation emanating from the focus directly through the window without reflection in an organized beam.

14. In the method of claim 9, the step of reflecting the first portion of the detectable radiation at least once comprising reflecting the detectable radiation only once prior to passing the same through the window in an organized beam.

15. In the method of claim 14, the step of reflecting the second portion of the detectable radiation at least three times comprising reflecting the detectable radiation only three times prior to passing the same through the window in an organized beam.

16. A method of collecting detectable radiation produced by the presence of individually isolated particulate material, comprising the steps of:
   radiating the detectable radiation from a focus of an ellipsoidal reflector surface of a reflector chamber,
   reflecting off of the ellipsoidal reflector surface a first portion of the detectable radiation emanating from the focus at least once but not more than twice,
   reflecting off of the ellipsoidal reflector surface a second portion of the detectable radiation emanating from the focus by at least one pair of reflections more than the number of reflections of the first portion,
   passing the first portion and second portion of the detectable radiation through a window formed in the ellipsoidal reflector surface in an organized beam.

17. In the method of claim 16, the step of reflecting the first portion of the detectable radiation at least once comprising reflecting the first portion only once prior to passing the same through the window in an organized beam.

18. In the method of claim 16, the step of reflecting most of the first portion of the detectable radiation at least once comprising reflecting the first portion only twice prior to passing the same through the window in an organized beam.

19. In the method of claim 16, the step of reflecting the second portion of the detectable radiation comprising reflecting the same by only one pair of reflections more than the number of reflections of the first portion.

20. In the radiation collector apparatus of claim 1, a collecting lens positioned on said symmetry axis having a lens focus disposed in coincident relationship with the adjacent focus of said pair of foci of said ellipsoidal reflector surface, said collecting lens and said window each being configured and dimensioned to subtend substantially equal solid angles with respect to the adjacent focus of said ellipsoidal reflector surface.

21. In the radiation collector apparatus of claim 20, said collecting lens having a f-number no smaller than 0.7.

* * * * *